United States Patent
Ahlbom et al.

(10) Patent No.: US 6,457,563 B1
(45) Date of Patent: Oct. 1, 2002

(54) ARRANGEMENT IN A CIRCULATION LUBRICATION SYSTEM

(75) Inventors: Kari Ahlbom; Ari Airaksinen, both of Muurame; Kari Antila, Korpilahti; Jari Rinkinen, Tampere; Arto Alfthan, Tarttila, all of (FI)

(73) Assignee: Safematic Oy, Muurame (FI)

( * ) Notice: Subject to any disclaimer, the term of this patent is extended or adjusted under 35 U.S.C. 154(b) by 0 days.

(21) Appl. No.: 09/367,286

(22) PCT Filed: Feb. 11, 1998

(86) PCT No.: PCT/FI98/00121

§ 371 (c)(1),
(2), (4) Date: Dec. 10, 1999

(87) PCT Pub. No.: WO98/37356

PCT Pub. Date: Aug. 27, 1998

(30) Foreign Application Priority Data

Feb. 18, 1997 (FI) .................................................. 970686

(51) Int. Cl.$^7$ ................................................ F01M 9/00
(52) U.S. Cl. .............................. 184/6.21; 159/DIG. 16; 159/DIG. 40; 196/105; 196/114; 208/179
(58) Field of Search ............................... 184/6.21, 6.24, 184/1.5, 6; 417/313; 159/DIG. 16, DIG. 40; 196/105, 114; 208/179, 187

(56) References Cited

U.S. PATENT DOCUMENTS

| | | | | |
|---|---|---|---|---|
| 1,359,453 A | * | 11/1920 | Watson ........................ | 184/6.24 |
| 1,431,346 A | * | 10/1922 | Watson ........................ | 184/6.24 |
| 1,442,093 A | * | 1/1923 | Peterson et al. ............. | 184/6.24 |
| 1,847,817 A | * | 3/1932 | Cole ........................... | 184/6.24 |
| 1,864,095 A | | 6/1932 | Rodman et al. | |
| 2,229,623 A | * | 1/1941 | Cooley et al. ............... | 208/187 |
| 3,392,804 A | * | 7/1968 | Fleur et al. ................. | 184/6 |
| 3,483,984 A | | 12/1969 | Wolkenhauer ............... | 210/168 |
| 3,603,087 A | * | 9/1971 | Burkland ..................... | 184/6 |
| 3,712,420 A | * | 1/1973 | Pelizzoni et al. ........... | 184/103.1 |
| 3,797,248 A | * | 3/1974 | Witzel et al. ................ | 60/646 |
| 3,915,860 A | * | 10/1975 | Priest ......................... | 208/179 |
| 3,939,356 A | * | 2/1976 | Loane ......................... | 290/52 |
| 4,089,662 A | * | 5/1978 | Williams ..................... | 55/166 |
| 4,261,838 A | | 4/1981 | Halleron ..................... | 210/774 |
| 4,272,371 A | | 6/1981 | Moses et al. ................ | 210/168 |
| 4,289,583 A | * | 9/1981 | Engel .......................... | 208/179 |
| 4,378,978 A | * | 4/1983 | Andersson et al. .......... | 55/52 |
| 4,568,428 A | * | 2/1986 | Rigg et al. .................. | 203/91 |
| 4,830,745 A | | 5/1989 | Van der Meulen ......... | 210/168 |
| 5,171,130 A | * | 12/1992 | Kume et al. ................. | 184/6.16 |
| 5,211,856 A | * | 5/1993 | Shen ........................... | 210/799 |

(List continued on next page.)

FOREIGN PATENT DOCUMENTS

DE      38 44 060       7/1990

OTHER PUBLICATIONS

"Fluid Mechanics", 3rd Edition; Longman Scientific & Technical; Douglas et al., 1995.*

Primary Examiner—David A. Bucci
Assistant Examiner—Chong H. Kim
(74) Attorney, Agent, or Firm—Pillsbury Winthrop LLP

(57) ABSTRACT

An arrangement in a circulation lubrication system include a lubricating oil tank, pressure pipe lines for supplying oil to parts to be lubricated, return pipe lines for returning the oil from the parts to be lubricated to the oil tank, and a mechanism configured to pump oil into the pressure pipe lines and maintaining a desired state of lubrication. The mechanism configured to pump the oil into the pressure pipe lines may include a circulation lubrication pump and a suction duct through which the lubricating oil flows out of a lubricating oil tank, an underpressure tank coupled to the suction duct leading off from the lubricating oil tank, to the suction side of the circulation lubrication pump. The underpressure tank is a tank which allows the water contained in the oil to evaporate. To prevent cavitation of the circulation lubrication pump, the underpressure tank is placed substantially higher than the lubricating oil tank.

6 Claims, 2 Drawing Sheets

U.S. PATENT DOCUMENTS

| | | | | |
|---|---|---|---|---|
| 5,630,912 A | * | 5/1997 | LeFebvre | 208/179 |
| 5,772,402 A | * | 6/1998 | Goodman | 184/1.5 |
| 5,820,748 A | * | 10/1998 | Shadikhan | 208/179 |
| 5,858,070 A | * | 1/1999 | Ham et al. | 95/248 |
| 5,900,155 A | * | 5/1999 | Bedi | 184/1.5 |
| 6,066,060 A | * | 5/2000 | Harper | 184/6 |

* cited by examiner

ARRANGEMENT IN A CIRCULATION LUBRICATION SYSTEM

This application is the national phase of international application PCT/FI98/00121 filed Feb. 11, 1998 which designated the U.S.

BACKGROUND OF THE INVENTION

1. Field of the Invention

The invention relates to an arrangement in a circulation lubrication system comprising a lubricating oil tank; pressure pipe lines for supplying oil to parts to be lubricated; return pipe lines for returning the oil from the parts to be lubricated to the oil tank; and means for pumping the oil into the pressure pipe lines and maintaining a desired state of lubrication, the means for pumping the oil into the pressure pipe lines comprising a circulation lubrication pump and a suction duct through which the lubricating oil is arranged to flow out of the lubricating oil tank.

2. Description of the Related Art

Circulation lubrication systems are today used widely to lubricate various machines especially when the lubricant is used for cooling the parts to be lubricated. An example of the use of circulation lubrication is the lubrication of the bearings of the drying cylinders in paper machines or the lubrication of gas turbines. In both cases the bearings are subject to a thermal load from the outside.

Circulation lubrication is also used when the part to be lubricated creates considerable dissipation power. One example of such applications is the lubrication of gear boxes.

Still another use of circulation lubrication is in cases where the lubricant may get dirty in the part to be lubricated, and it should be possible to reuse the lubricant after cleaning.

A circulation lubrication system usually comprises a pump operated by an electric motor. The pump brings the oil into motion. The output of the pump is usually selected so that it exceeds the required flow rate by 10 to 20%, so that a sufficient operating margin is left for the control of bypass pressure. Oil is arranged to pass through replaceable filters. The filters are often arranged in two groups so that one group can be separated by means of valves and the filters can be changed without having to stop the entire assembly. An electric or steam-operated heater is often used for further heating the oil. The oil is cooled by a heat exchanger having water or air cooling means. The cooling power is adjusted by a temperature regulator provided for supply oil. The set value of the temperature regulator is often typically about 55° C. Pressure control is often effected by a bypass valve back to the oil tank. Depending on the system, the set values of the pressure controller typically vary between 5 and 20 bar.

Oil is supplied to parts needing lubrication, such as different parts in paper machine, by means of pressure trunk pipes usually made of rustproof material. The oil flows in the pipes as a laminar flow, and so the pressure drop is small. From the trunk pipes the oil is distributed to a plurality of flow metering boards wherefrom it is divided into rising pipes to be supplied to a number of parts to be lubricated. From these parts the oil is passed through return pipes by utilizing gravitation into collector pipes on the return side. The oil is passed under the influence of gravitation through the collector pipes into the tank of the circulation lubrication assembly. The pipes on the return side are never full of oil. The inclination of the pipes is about 2 to 3% towards the tank of the assembly. Before the tank the return oil is passed through a coarse-mesh filter. The oil returned into the tank is then again sucked into circulation by the pump. The dimensions of the tank are usually such that the oil stays in the tank for a certain period of time depending on the viscosity of the oil.

In the system the lubricating oil tank has several functions for conditioning the oil before recirculation. One function of the tank is to allow air bubbles contained in the oil to rise to the surface. Air bubbles may increase the liability of the pump to cavitation, and they may deteriorate the lubricating film formed on the part needing lubrication. Another function is to allow large dirt particles with density considerably higher than that of oil to deposit on the bottom of the tank. To some extent water drops contained in the oil will also fall down in the tank. The density of water is so close to that of oil that the falling speed is slow. The tank condenses moist air flowing in the return pipes on the tank walls and drains the water along the walls, thus collecting it on the bottom of the tank. The tank also cools the oil through the walls. Furthermore, the tank forms a space into which the pipe lines are emptied at system shutdowns, and the tank serves as an oil storage in case of a pipe leakage, so that the machine to be lubricated can be shut down controllably. Still another function of the pump is to make sure that there is always oil in the pump suction means in order that air would not be sucked along. The moisture and suitable temperature also enable bacteria to grow in the tank.

The tank also comprises thermostat-controlled oil heaters, which may be either electric or steam-operated heaters. The heaters are used to heat the great amount of oil contained in the oil tank within 4 to 8 hours typically to about 55° C. before the system is started as the screw pumps used are not able to pump cold oil of high viscosity at full power without the risk of cavitation.

Present circulation lubrication oil tanks have had similar basic solutions for decades. A tank is basically a rectangle, the capacity of which may typically vary from a few hundred liters up to 30 cubic meters. The size required depends on the operating principle of the tanks, according to which principle, to keep in good condition, the oil must be allowed to rest in the tank about 30 minutes, so that impurities contained in the oil could be separated before the oil is recirculated. In addition to storing the oil, the tank must also cool the oil and be able to separate air, water and other impurities from the oil as stated above.

Because of their big size, the previously used tanks are often difficult to place in connection with machinery needing lubrication. Furthermore, a great amount of oil involves great investments, and especially today, it also involves a fire load, brought about by a great capacity, with other environmental risks. In practice, measurements have also proved that despite the big size of the tank only a small portion of the capacity of the tank is efficiently involved in the oil circulation. When the function of the flow fields is measured by calculating courses of particles without a mass, the same phenomenon is observed also numerically. In a typical conventional tank provided with partition walls the operating efficiency is only 35 to 44%, which indicates the actual flow-through time in proportion to the theoretical flow-through time. In practice, for example a tank of 8 cubic meters, in which 350 liters of oil flow per minute, has the theoretical flow-through time of 22 minutes 52 seconds, in which time the amount of oil would go once through the system. In reality however, warm oil entering the tank tends to form internal flow channels inside the tank due to differences in the viscosity of oil. These channels make the contents of the tank form walls in a stationary oil mass and a main flow-through channel formed in the oil mass. In reality, the theoretical flow-through time of 22 minutes 52 seconds is now in a range of 8 to 10 minutes, which is definitely too short. In addition to channeling, the flow field of previously known tanks is also subject to heavy whirl forming, which makes the separation of dirt particles difficult. Channeling results from high flow rates in the tank.

To enhance the conditioning of oil, the oil capacity is also underpressurized. It is generally known to separate water from oil by means of underpressure, so that water contained in the oil evaporates and can be discharged. The performances of commercially available underpressurizers are within a range of 0 to 20 liters per minute, due to which this kind of device can only be connected with a by-circulation of the tank. The flow capacities of the present circulation lubrication systems are typically several hundreds of liters per minute, so the performance of an evaporator connected with the by-circulation remains insufficient.

SUMMARY OF THE INVENTION

The invention relates to the conditioning of oil and especially to the conditioning of oil by means of underpressure. The object of the invention is to provide an arrangement by means of which the drawbacks of the prior art can be eliminated, i.e. water can be separated from the lubricating oil as efficiently as possible. This is achieved by means of an arrangement according to the invention, which is characterized in that to a suction duct leading off from the lubricating oil tank, to the suction side of a circulation lubrication pump, is attached an underpressure tank that is placed substantially higher than the lubricating oil tank, and that comprises means for discharging water allows the water contained in the oil to evaporate.

The primary advantage of the invention is that it allows very efficient conditioning of the oil, so that the water contained in the oil can be separated efficiently from the oil in a very simple manner. A further advantage of the invention is that it is simple to carry out, and so its introduction and use are economical. Another advantage of the invention is that it can be applied to various lubricating oil tanks already in use, so that the conditioning of oil in old lubrication systems can be enhanced without substantial investment costs.

DESCRIPTION OF THE SEVERAL VIEWS OF THE DRAWINGS

In the following the invention will be described more closely by means of a preferred embodiment shown in the attached drawing, wherein.

DETAILED DESCRIPTION OF THE INVENTION

Figure 1:
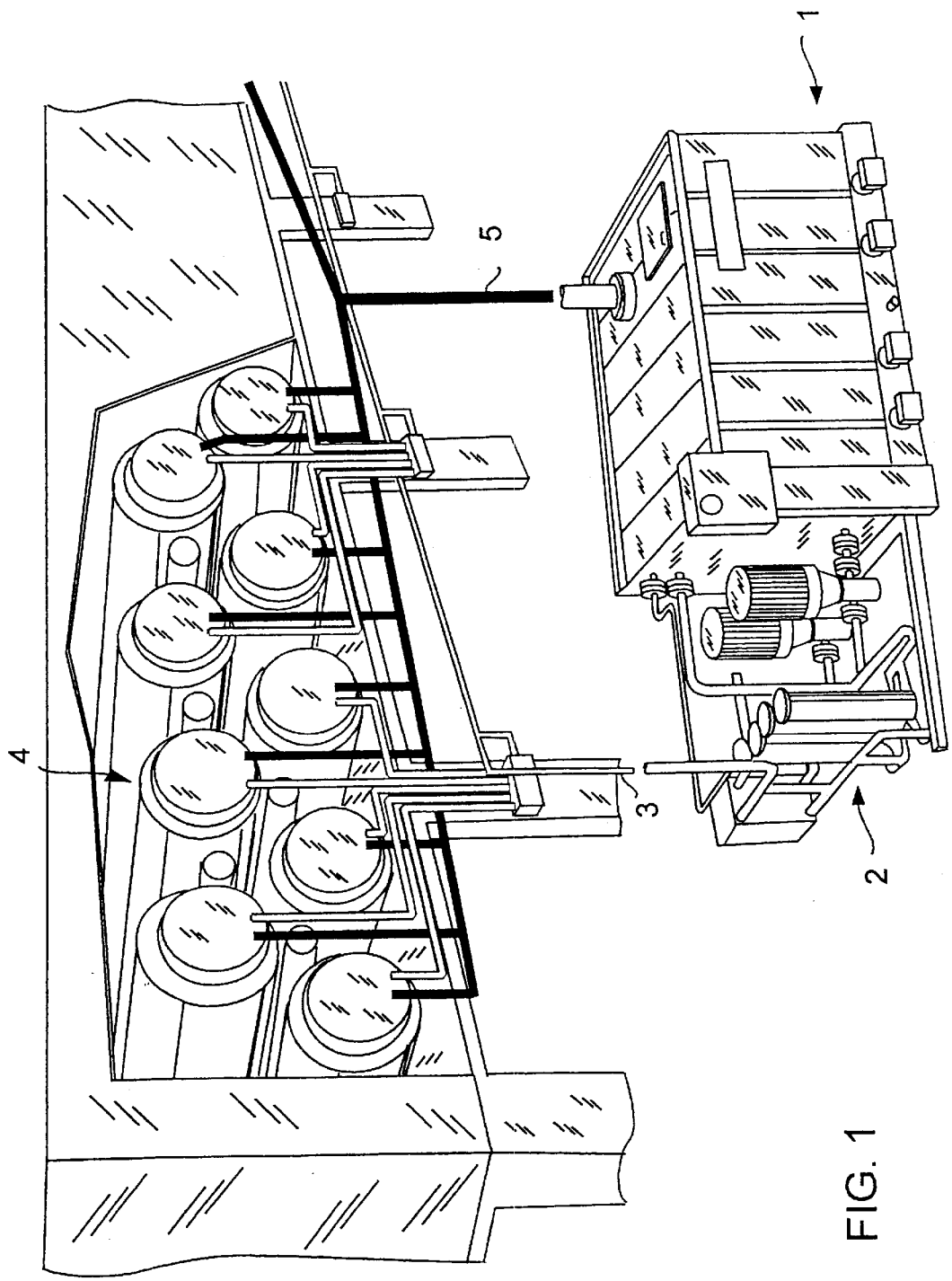
FIG. 1 is a general view of a circulation lubrication system for a paper machine.

FIG. 1 is a general view of a circulation lubrication system for a paper machine. The reference numeral 1 indicates generally an oil tank and the reference numeral 2 indicates generally an assembly comprising pumps, filters and other similar devices. The reference numeral 3 shows pressure pipe lines for supplying oil used as a lubricant to parts 4 to be lubricated, in this special case to drying cylinders in the paper machine. Further in FIG. 1, the reference numeral 5 indicates return pipe lines for returning the oil from the parts to be lubricated to the oil tank 1. The structure and operation of the system shown in FIG. 1 are obvious to one skilled in the art, so these matters will not be described more closely herein. The functions of the oil tank 1 have been described above.

Figure 2:
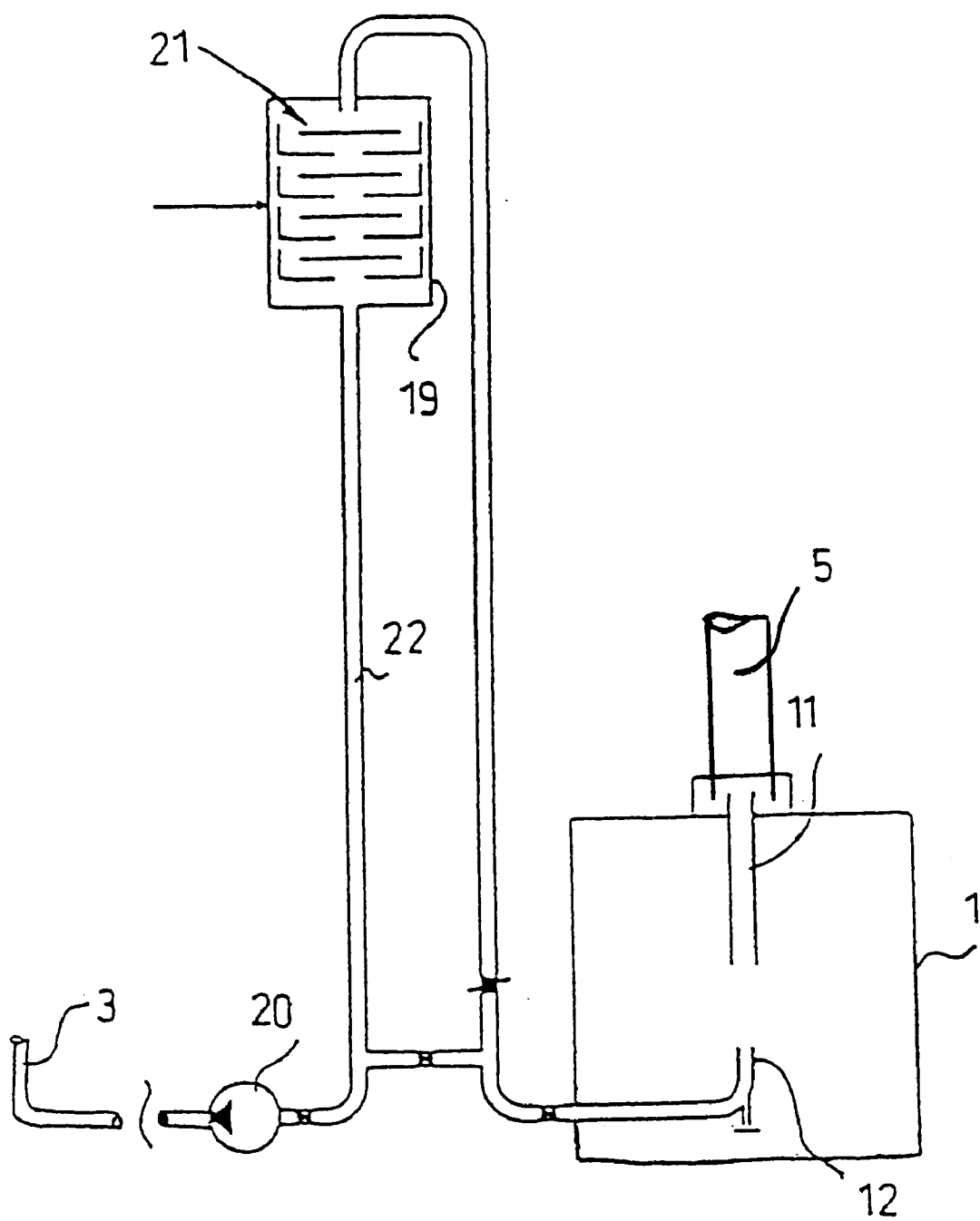
FIG. 2 is a general view of an arrangement according to the invention.

FIG. 2 shows a solution of the arrangement according to the invention. In FIG. 2, like reference numerals indicate correspondingly as in FIG. 1. The aim of the solution shown in FIG. 2 is to enhance the conditioning of the oil by underpressurizing the oil capacity as described above. Underpressurizing is not new as such in the conditioning of oil, but previously underpressurizing has not been implemented in the manner described in FIG. 2.

As stated here above, it is previously known to separate water from oil by means of underpressure, so that the water contained in the oil evaporates and can be discharged. However, the performances of the commercially available underpressurizers are so poor that they can only be attached to a by-circulation of the lubricating oil tank. The flow capacities of present circulation lubrication systems are so great that the performance of an evaporator attached to a by-circulation remains insufficient. The greater the negative pressure, or the lower the absolute pressure, the better water evaporates from oil. The most efficient solution of discharging water is achieved, if the entire flow capacity in use can be underpressurized. In the arrangement shown in FIG. 2 the underpressure is maximized, and so the entire oil mass in flow is subjected to underpressure and evaporation.

In FIG. 2 the reference numeral 19 indicates an underpressure tank and the reference numeral 20 indicates a circulation lubrication pump. The underpressure tank 19 is attached to the suction side of the circulation lubrication pump 20, to a pipe connected to a suction duct 12, which underpressure tank is placed substantially higher than the lubricating oil tank 1. In the underpressure tank 19 a negative pressure is produced, by means of which the oil is sucked out of a tank 1 into the underpressure tank 19. The negative pressure can be produced by any known means. For example, the negative pressure can be achieved by means of an underpressure pump. The underpressure pump must produce a negative pressure of at least 0.8 bar to vaporize the water contained in the oil. For example, blade wheel pumps have been used as an underpressure pump in the pressure range of 0.1 to $10^5$ Pa. Other typical solutions are a rotating pump, a liquid ring pump and a so called runner pump. Different underpressure pumps and, in general, solutions for producing a negative pressure are obvious to one skilled in the art, so these matters will not be described more closely herein.

In an arrangement according to the invention the water contained in the oil evaporates in an underpressure tank 19. The underpressure tank also comprises means 21 for discharging the evaporated water from the underpressure tank 19. The underpressurized oil flows through the underpressure tank 19 to a sucking circulation lubrication pump 20 and further through the pump to the parts to be lubricated. The oil is passed through pressure pipe lines 3 to the parts to be lubricated by means of the circulation lubrication pump 20. The oil returns from the parts to be lubricated to the lubricating oil tank 1 through return pipe lines 5. The oil is conditioned before recirculation by means of the arrangement shown in FIG. 2, i.e. by means of the lubricating oil tank 1 and the underpressure tank 19 as described here above.

Installing the underpressure equipment substantially higher than the lubricating oil tank allows the use of the optimal maximum underpressure without that the suction capacity of the pump is disturbed. The difference in altitude between the underpressure tank 19 and the suction duct 20 of the tank is essential to the operation. If there were no difference in altitude, the suction power of the pump would not be sufficient against the underpressure provided for evaporation, in which case the pump would cavitate. In the arrangement shown in FIG. 2 the maximal underpressure can be achieved and the pump will maintain its suction power due to the difference in the oil level in a suction line 22.

The above embodiments are by no means intended to restrict the invention, but the invention can be modified quite freely within the scope of the claims. Accordingly, it is obvious that the arrangements according to the invention or its details need not necessarily be similar to those shown in the figures but other solutions are possible as well. As stated above, the negative pressure in the underpressure tank can be produced in any previously known manner. The lubricating oil tank may also have any kind of structure, since the invention can be applied in connection with different lubricating oil tanks.

What is claimed is:

1. A circulation lubrication system comprising:

a lubricating oil tank;

pressure pipe lines configured to supply oil to the part to be lubricated;

return pipe lines configured to return the oil from the part to be lubricated to the oil tank;

a mechanism configured to pump the oil into the pressure pipe lines and maintain a desired state of lubrication, the oil pumping mechanism including a circulation lubrication pump and a suction duct configured to convey the lubricating oil to flow out of the lubricating oil tank, an underpressure tank coupled to the suction duct and the lubricating oil tank to a suction side of the circulation lubrication pump;

a mechanism configured to discharge water evaporated from the oil in the underpressure tank; and a suction line coupling the circulation lubrication pump, the underpressure tank and the lubricating oil tank, wherein, the underpressure tank is configured to allow water contained in the oil to evaporate, and the underpressure tank is placed substantially higher than the lubricating oil tank such that cavitation of the circulation lubrication pump is prevented, wherein a negative pressure is produced in the underpressure tank which sucks oil contained in the lubricating oil tank into the underpressure tank.

2. The circulation lubrication system of claim 1, wherein an entire amount of oil mass used in the circulation lubrication system is subject to underpressure and evaporation.

3. The circulation lubrication system of claim 1, wherein the negative pressure is at least 0.8 bar.

4. The circulation lubrication system of claim 1, wherein water contained in the oil evaporates in the underpressure tank.

5. The circulation lubrication system of claim 1, wherein a maximal underpressure is achieved and the circulation lubrication pump maintains its suction power due to a difference in oil level in a suction line.

6. The circulation lubrication system of claim 1, wherein oil flowing through the circulation lubrication system is conditioned by the lubricating oil tank and the underpressure tank after the oil is used to lubricate the part.

* * * * *